United States Patent
Tsai

(10) Patent No.: US 8,622,181 B2
(45) Date of Patent: Jan. 7, 2014

(54) BRAKE OPERATING DEVICE OF ELECTRIC BICYCLE WITH SENSOR

(75) Inventor: Szu-Fang Tsai, Changhua (TW)

(73) Assignee: Tektro Technology Corporation, Changhua (TW)

( * ) Notice: Subject to any disclaimer, the term of this patent is extended or adjusted under 35 U.S.C. 154(b) by 147 days.

(21) Appl. No.: 13/410,261

(22) Filed: Mar. 1, 2012

(65) Prior Publication Data
US 2013/0228406 A1    Sep. 5, 2013

(51) Int. Cl.
*B60T 11/10*    (2006.01)

(52) U.S. Cl.
USPC ....... 188/344; 188/24.22; 188/2 D; 74/502.2; 74/523; 200/61.87

(58) Field of Classification Search
CPC ........................................................ B62L 3/023
USPC ............. 188/24.11, 24.22, 26, 344; 74/502.2, 74/519, 523, 524, 525; 200/61.87, 335
See application file for complete search history.

(56) References Cited

U.S. PATENT DOCUMENTS

| 4,076,093 A | * | 2/1978 | Mizuno ........................... 74/523 |
| 5,793,007 A | * | 8/1998 | Matsumoto ................ 200/61.87 |
| 6,246,319 B1 | * | 6/2001 | Hsu ................................ 340/479 |
| 2011/0304288 A1 | * | 12/2011 | Saida ............................. 318/376 |
| 2012/0161420 A1 | * | 6/2012 | Eberlein et al. ............... 188/344 |
| 2013/0228405 A1 | * | 9/2013 | Tsai .............................. 188/344 |

FOREIGN PATENT DOCUMENTS

| CN | 200981621 Y | * | 11/2007 |
| CN | 202038422 U | * | 11/2011 |
| CN | 202508254 U | * | 10/2012 |
| JP | 2011225093 A | * | 11/2011 |
| TW | 201202089 A | * | 1/2012 |

* cited by examiner

Primary Examiner — Thomas J Williams

(57) ABSTRACT

A brake operating device of an electric bicycle is provided with a brake lever including a projecting plate at one end, and a bifurcated cable anchoring member pivotably secured to the projecting plate; a magnetic member adhered to one side of the cable anchoring member; a housing pivotably secured to the brake lever and including a hydraulic cylinder and a cylindrical socket including an opening distal the brake lever, and internal threads proximate the opening; a spring depressible sensor including a sensing member disposed in the socket, and an electric wire extending from the sensing member; a hollow threaded fastener adjustably threadedly secured to the internal threads of the socket to engage the sensing member; and a cylindrical member releasably mounted proximate to the opening and secured to the fastener. The electric wire passes the fastener and leaves the housing.

8 Claims, 7 Drawing Sheets

US 8,622,181 B2

BRAKE OPERATING DEVICE OF ELECTRIC BICYCLE WITH SENSOR

BACKGROUND OF THE INVENTION

1. Field of the Invention

The invention relates to bicycle brakes and more particularly to a sensor type brake operating device of an electric bicycle.

2. Description of Related Art

A conventional brake operating device of electric bicycle is shown in FIG. 7 and comprises a housing 71, a brake lever 72 rotatably mounted on the housing 71, a cable 73 having one end secured to the brake lever 72, a control line 74 having one end fastened in the housing 71 and the other end electrically connected to a DC motor (not shown), and a contact switch 75 provided at one end of the control line 74.

In an inoperative state of the brake operating device, the brake lever 72 presses against the contact switch 75 to enable the control line 74. In response to pressing the brake lever 72 against a grip (not shown), the contact switch 75 elastically moves away from the control line 74 to open the circuit. As a result, a braking force is transmitted from the cable 73 to the brake near the wheel.

However, a number of drawbacks have been found in the conventional brake operating device of electric bicycle. In detail, the contact switch is poor in sensitivity. Further, the contact switch is neither robust nor durable. Furthermore, the brake operation is not as effective as desired. Thus, the need for improvement still exists.

SUMMARY OF THE INVENTION

It is therefore one object of the invention to provide a brake operating device of an electric bicycle comprising a brake lever comprising a projecting plate at one end, and a bifurcated cable anchoring member pivotably secured to the projecting plate; a magnetic member adhered to one side of the cable anchoring member; a housing pivotably secured to the brake lever and comprising a hydraulic cylinder and a cylindrical socket including an opening distal the brake lever, and internal threads proximate the opening; a spring depressible sensor comprising a sensing member disposed in the socket, and an electric wire extending from the sensing member; and a hollow threaded fastener adjustably threadedly secured to the internal threads of the socket to engage the sensing member; wherein the electric wire passes the fastener and leaves the housing.

The above and other objects, features and advantages of the invention will become apparent from the following detailed description taken with the accompanying drawings.

DETAILED DESCRIPTION OF THE INVENTION

Figure 1:
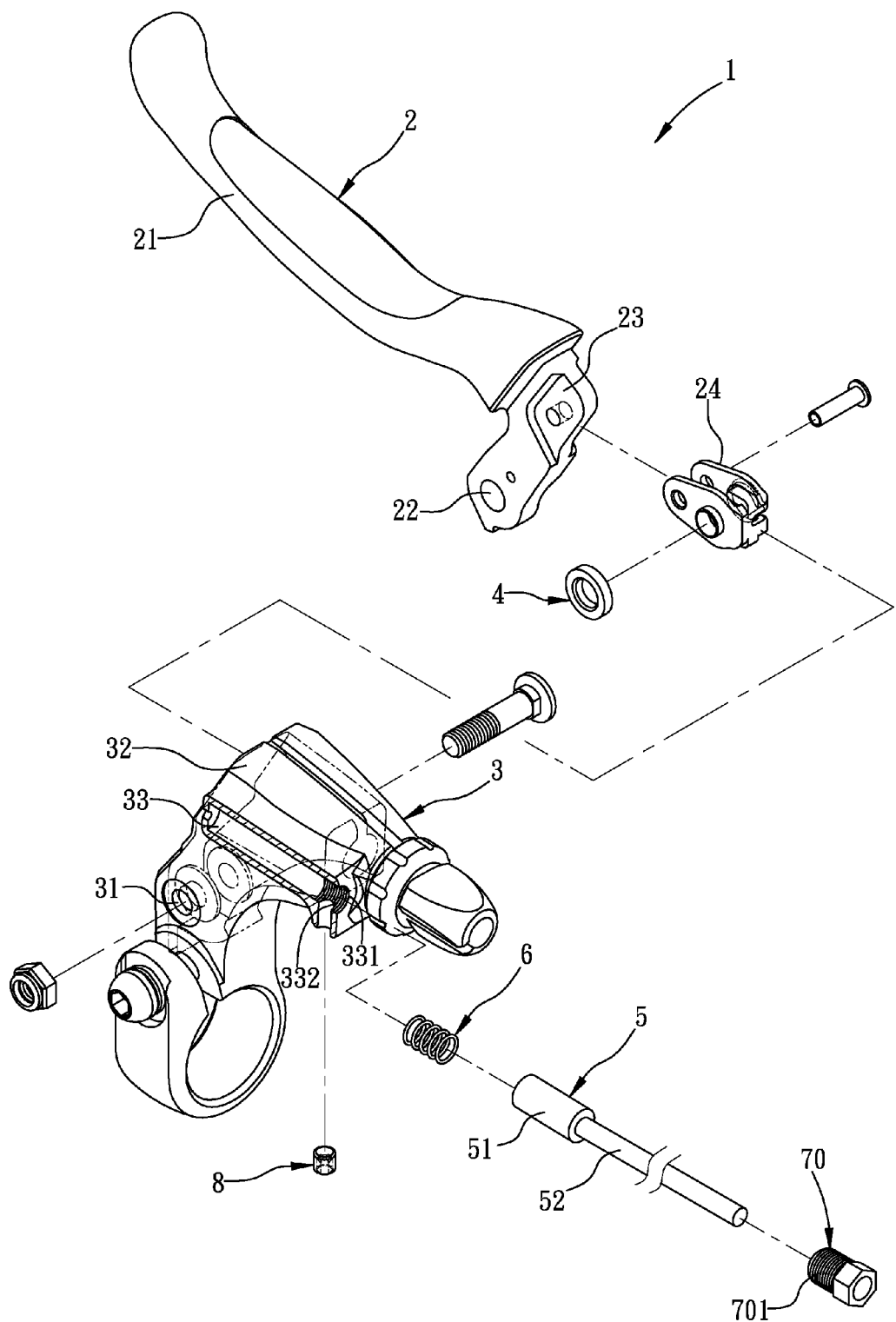
FIG. 1 is an exploded view of a first preferred embodiment of a brake operating device of electric bicycle according to the invention.
Figure 2:
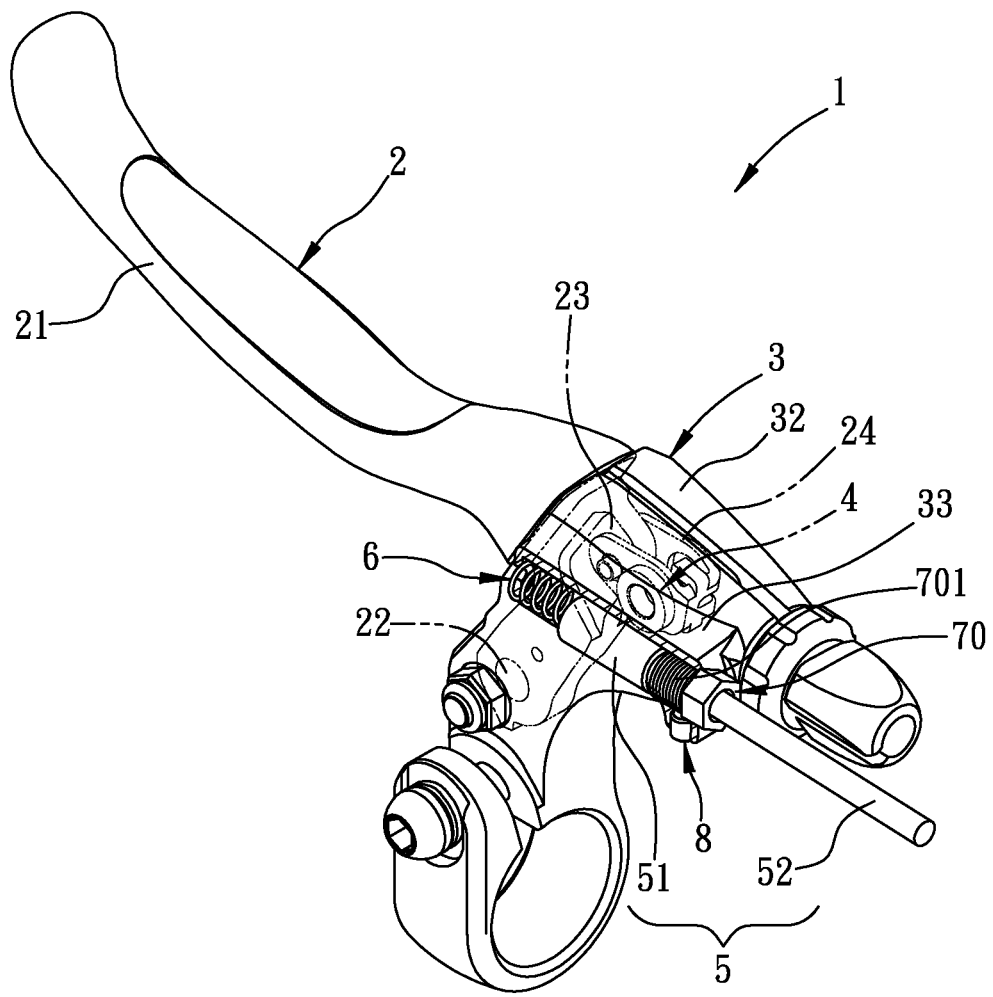
FIG. 2 is a perspective in part cutaway view of the assembled brake operating device of FIG. 1.
Figure 3:
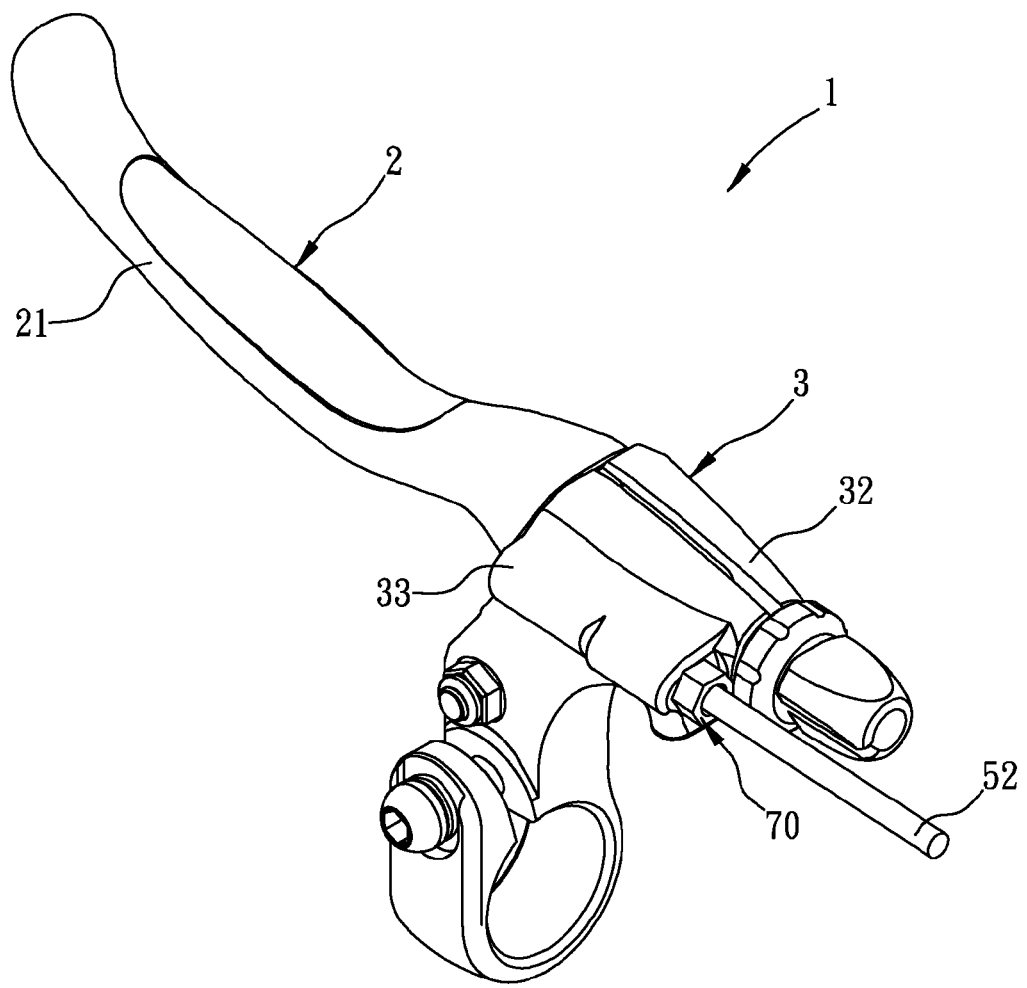
FIG. 3 is a perspective view of the assembled brake operating device of FIG. 1.
Figure 4:
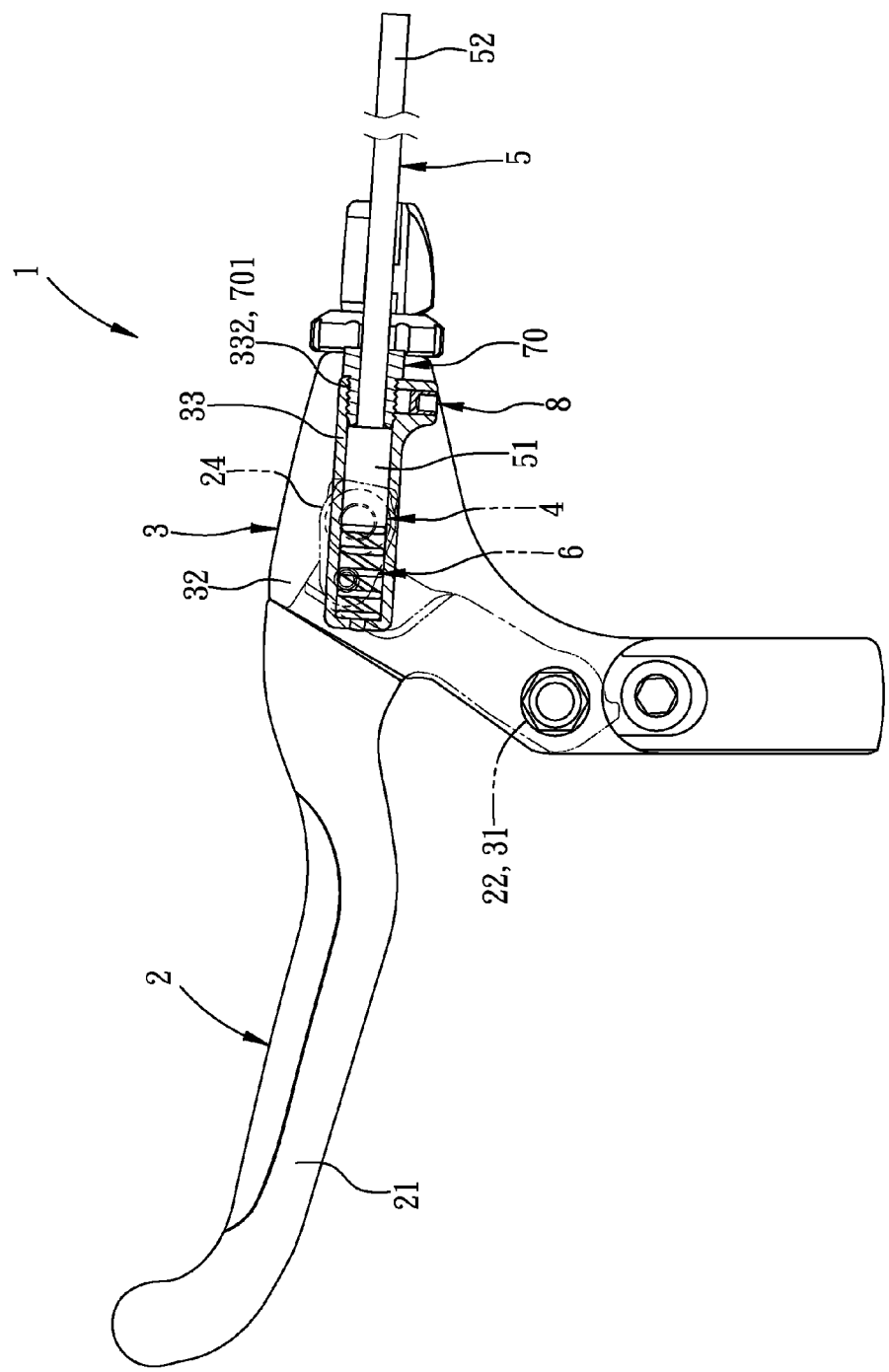
FIG. 4 is a side elevation in part section of FIG. 3.
Figure 5:
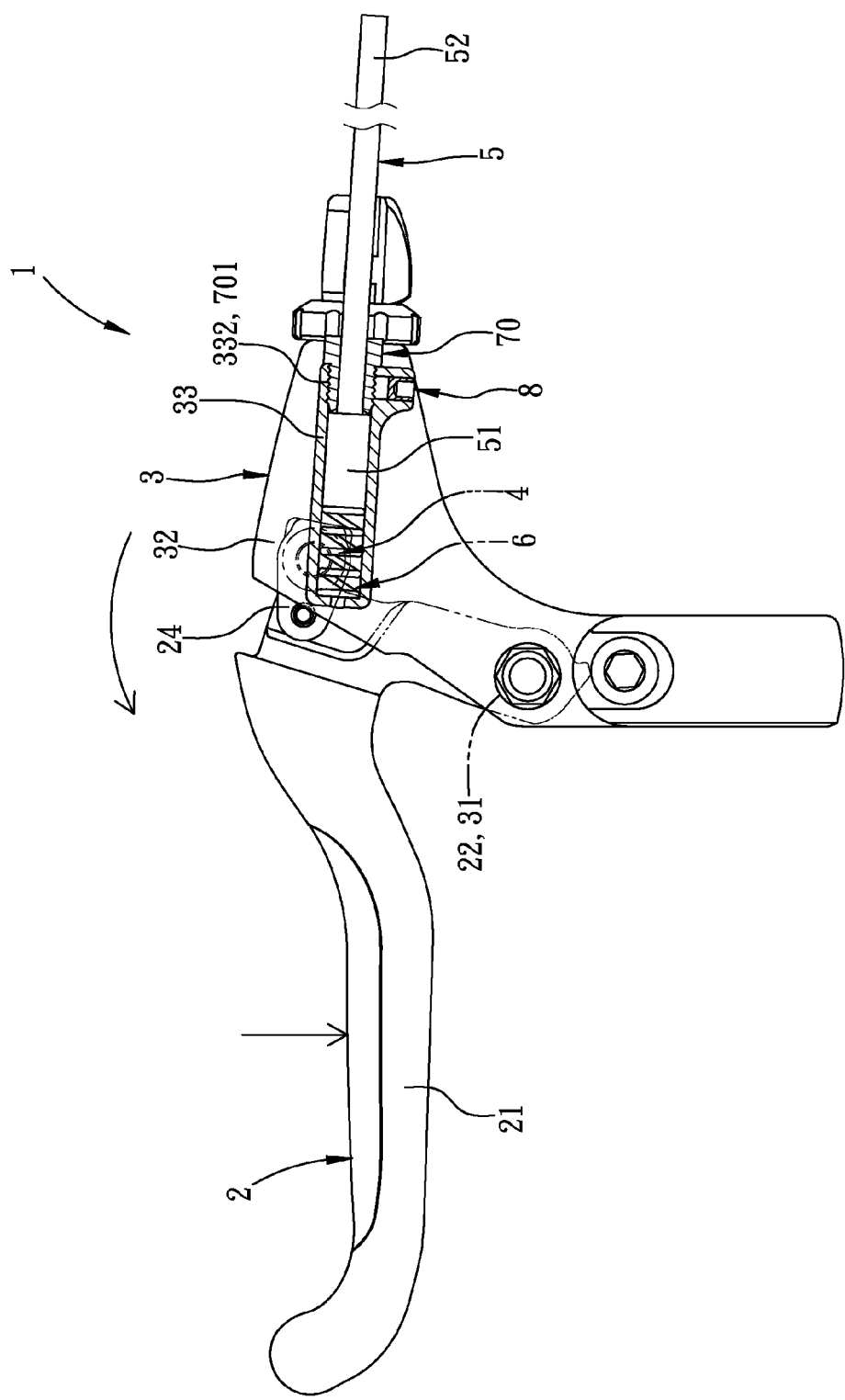
FIG. 5 is a view similar to FIG. 4 showing the brake lever being pressed to actuate brake.

Referring to FIGS. 1 to 5, a brake operating device 1 of electric bicycle in accordance with a first preferred embodiment of the invention comprises the following components as discussed in detail below.

A brake lever 2 comprises a gripping portion 21, a pivot portion 22, a projecting plate 23, and a bifurcated cable anchoring member 24 pivotably secured to the projecting plate 23. A magnetic ring 4 formed of permanent magnet is adhered to one side of the cable anchoring member 24.

A housing 3 comprises a pivot portion 31 pivotably secured to the pivot portion 22 using a pivot (not numbered), a hydraulic cylinder 32, and a cylindrical socket 33 adjacent to and parallel to the hydraulic cylinder 32, the socket 33 having an opening 331 distal the brake lever 2 and including internal threads 332 proximate the opening 331. The hydraulic cylinder 32 is a part of a conventional hydraulic brake system of an electric bicycle. Thus, detailed description of the hydraulic cylinder 32 and associated parts is omitted herein for the sake of brevity.

A helical spring 6 is anchored at bottom of the socket 33. A sensor 5 comprises an enlarged sensing member 51 disposed in the socket 33 and engaging the spring 6, and an electric wire 52 extending from the sensing member 51. A hollow fastener 70 includes an externally threaded shank 701 adjustably threadedly secured to the internal threads 332 to engage the sensing member 51. Further, the electric wire 52 passes the fastener 70 and leaves the housing 3 to be electrically connected to a DC (direct current) motor (not shown) of the electric bicycle.

Preferably, the sensor 5 is a Hall-effect sensor. Finally, a cylindrical member 8 is releasably mounted proximate to the opening 331 and secured to the fastener 70.

For adjusting brake sensitivity, an individual may turn the fastener 70 to change the position of the sensing member 51 relative to the magnetic ring 4 so as to change a magnetic force exerted upon the sensing member 51 by the magnetic ring 4 (i.e., changing magnetic field).

Moreover, an individual may press the brake lever 2 against a grip to pivot the brake lever 2 (and thus the magnetic ring 4). As such, a relative position of the magnetic ring 4 and the sensing member 51 is changed because the magnetic ring 4 may move as a curve when the brake lever 2 pivots. As a result, the magnetic field is changed too.

Figure 6:
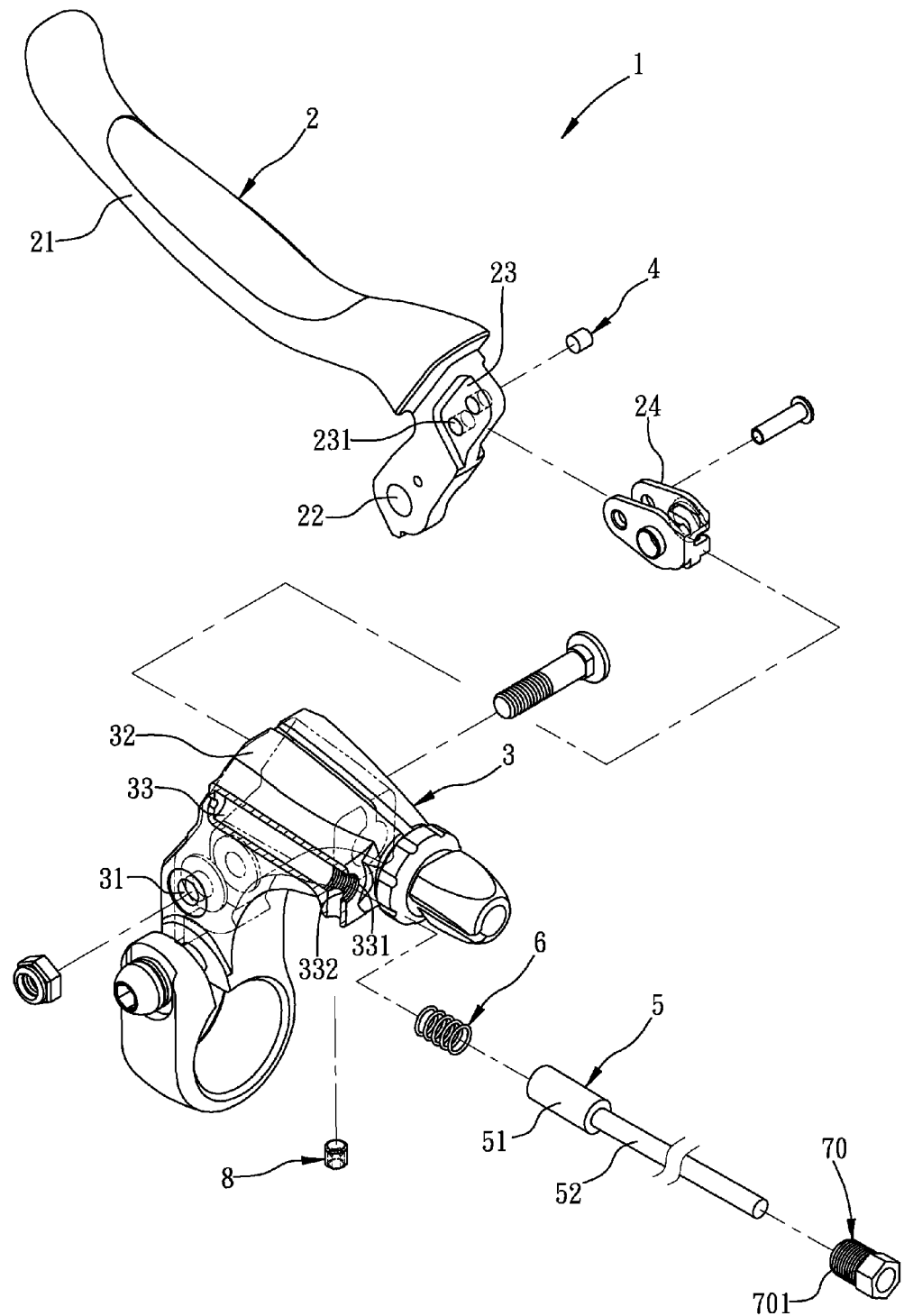
FIG. 6 is an exploded view of a second preferred embodiment of a brake operating device of electric bicycle according to the invention.
Figure 7:
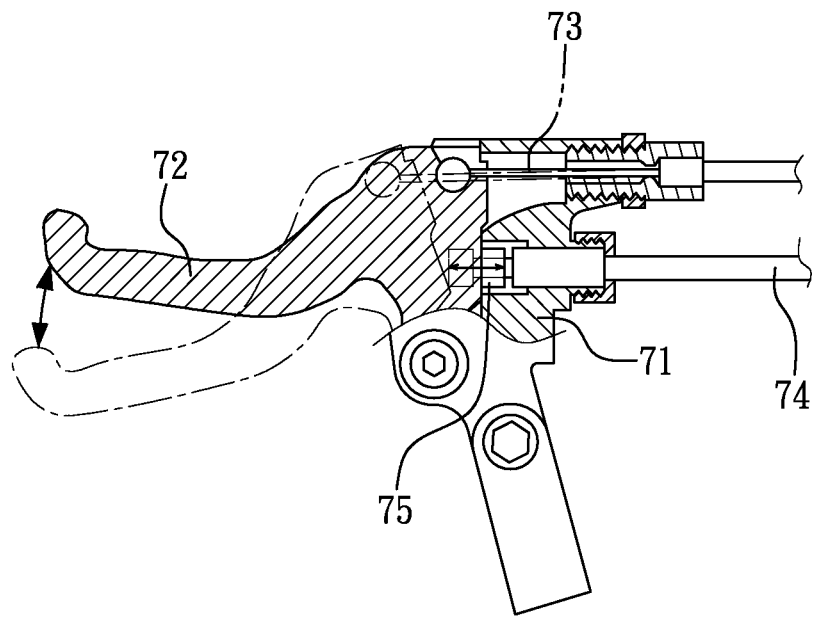
FIG. 7 is a schematic sectional view of a conventional brake operating device of electric bicycle.

Referring to FIG. 6, a brake operating device of electric bicycle in accordance with a second preferred embodiment of the invention is shown. The characteristics of the second preferred embodiment are substantially the same as that of the first preferred embodiment except the following: The magnetic ring 4 of the first preferred embodiment is replaced with a solid magnetic cylinder 4. Further, one hole through the projecting plate 23 of the first preferred embodiment is replaced with two parallel holes 231 in which one hole 231 is for pivotably connecting the main body of the brake lever 2 and the cable anchoring member 24 together and the other hole 231 is for disposing the magnetic cylinder 4.

While the invention has been described in terms of preferred embodiments, those skilled in the art will recognize that the invention can be practiced with modifications within the spirit and scope of the appended claims.

What is claimed is:

1. A brake operating device of an electric bicycle comprising:

a brake lever comprising a projecting plate at one end, and a bifurcated cable anchoring member pivotably secured to the projecting plate;

a magnetic member adhered to one side of the cable anchoring member;

a housing pivotably secured to the brake lever and comprising a hydraulic cylinder and a cylindrical socket including an opening distal the brake lever, and internal threads proximate the opening;

a spring depressible sensor comprising a sensing member disposed in the socket, and an electric wire extending from the sensing member;

a hollow threaded fastener adjustably threadedly secured to the internal threads of the socket to engage the sensing member; and a fastening member releasably mounted proximate to the opening and secured to the fastener;

wherein the electric wire passes the fastener and leaves the housing.

2. The brake operating device of claim 1, wherein the magnetic member moves as a curve when the brake lever pivots.

3. The brake operating device of claim 1, wherein the socket is adjacent to and parallel to the hydraulic cylinder.

4. The brake operating device of claim 1, wherein the sensor is a Hall-effect sensor.

5. A brake operating device of an electric bicycle comprising:

a brake lever comprising a projecting plate at one end, and a bifurcated cable anchoring member pivotably secured to the projecting plate;

a magnetic member disposed in the projecting plate;

a housing pivotably secured to the brake lever and comprising a hydraulic cylinder and a cylindrical socket including an opening distal the brake lever, and internal threads proximate the opening;

a spring depressible sensor comprising a sensing member disposed in the socket, and an electric wire extending from the sensing member;

a hollow threaded fastener adjustably threadedly secured to the internal threads of the socket to engage the sensing member; and a fastening member releasably mounted proximate to the opening and secured to the fastener;

wherein the electric wire passes the fastener and leaves the housing.

6. The brake operating device of claim 5, wherein the magnetic member moves as a curve when the brake lever pivots.

7. The brake operating device of claim 5, wherein the socket is adjacent to and parallel to the hydraulic cylinder.

8. The brake operating device of claim 5, wherein the sensor is a Hall-effect sensor.

* * * * *